United States Patent [19]
Heynderickx et al.

[11] Patent Number: 5,676,879
[45] Date of Patent: *Oct. 14, 1997

[54] MOLECULARLY ORIENTED SYNTHETIC RESIN COMPOSITION

[75] Inventors: Ingrid E. J. R. Heynderickx, Eindhoven, Netherlands; Dirk J. Broer, Wilmington, Del.; Grietje N. Mol, Eindhoven, Netherlands

[73] Assignee: U.S. Philips Corporation, New York, N.Y.

[*] Notice: The term of this patent shall not extend beyond the expiration date of Pat. No. 5,210,630.

[21] Appl. No.: 697,119

[22] Filed: Aug. 20, 1996

Related U.S. Application Data

[63] Continuation of Ser. No. 583,201, Jan. 4, 1996, abandoned, which is a continuation of Ser. No. 263,162, Jun. 20, 1994, abandoned, which is a continuation of Ser. No. 8,861, Jan. 25, 1993, abandoned, which is a continuation of Ser. No. 598,286, Oct. 16, 1990, abandoned.

[30] Foreign Application Priority Data

Oct. 18, 1989 [NL] Netherlands ............................ 8902577

[51] Int. Cl.$^6$ ..................... C09K 19/52; C09K 19/00; C08J 7/04; G02B 6/00
[52] U.S. Cl. ..................... 252/299.01; 428/1; 385/145; 427/513
[58] Field of Search ..................... 252/299.01, 299.6; 427/513, 163.2; 359/75, 76, 105, 106; 385/141, 145; 428/1

[56] References Cited

U.S. PATENT DOCUMENTS

| | | | |
|---|---|---|---|
| 4,293,435 | 10/1981 | Portugall | 52/299.01 |
| 4,733,941 | 3/1988 | Broer et al. | 359/106 |
| 4,758,447 | 7/1988 | Broer et al. | 427/513 |
| 5,034,153 | 7/1991 | Uchida et al. | 252/299.01 |
| 5,039,208 | 8/1991 | Ohnishi et al. | 252/299.01 |
| 5,068,052 | 11/1991 | Wantanabe et al. | 252/299.01 |
| 5,078,910 | 1/1992 | Litt | 252/299.01 |
| 5,206,752 | 4/1993 | Itoh et al. | 252/299.01 |
| 5,210,630 | 5/1993 | Heynderickx et al. | 252/299.01 |

FOREIGN PATENT DOCUMENTS 331233 6/1989 European Pat. Off. .

*Primary Examiner*—Philip Tucker
*Attorney, Agent, or Firm*—Norman N. Spain

[57] ABSTRACT

A molecularly oriented synthetic resin composition whose coefficient of linear thermal expansion in two mutually perpendicular directions, below the glass-transition temperature, is at least a factor of 3 smaller than in a third direction extending perpendicularly to the first two directions, is manufactured by curing a liquid-crystalline composition having a helicoidal order of molecules, so as to form a polymer network. The resins thus obtained are suitable for use as claddings on materials having a coefficient of thermal expansion which is smaller than that of most synthetic resins.

3 Claims, 2 Drawing Sheets

MOLECULARLY ORIENTED SYNTHETIC RESIN COMPOSITION

This is a continuation of application Ser. No. 08/583,201, filed Jan. 4, 1996, now abandoned which is a continuation of application Ser. No. 08/263,162, filed Jun. 20, 1994, now abandoned which is a continuation of application Ser. No. 08/008,861, filed Jan. 25, 1993 now abandoned; which is a continuation of application Ser. No. 07/598,286, filed Oct. 16, 1990 now abandoned.

CROSS REFERENCE TO RELATED APPLICATIONS

Copending U.S. patent application Ser. No. 07/598,320, now abandoned, filed concurrently herewith, relates to an LCD incorporating a layer of molecularly oriented synthetic resin composition.

BACKGROUND OF THE INVENTION

The invention relates to a molecularly oriented synthetic resin composition, and to a cladding manufactured from the composition.

The invention also relates to a method of manufacturing a molecularly oriented synthetic resin composition by curing a liquid-crystalline curable synthetic resin composition.

The expression "molecularly oriented" is to be understood to mean herein that anisotropic molecules having a preferred direction are present in the material concerned. In an unoriented synthetic resin the polymer molecules generally have the shape of an isotropic cluster.

Synthetic resin compositions are used as claddings on many different, whether or not flat, substrates, for example, on semiconductor devices and optical and electronic components. However, the problem which occurs is that the coefficient of linear thermal expansion of synthetic resins is one order of magnitude larger than that of most other solids such as metals, ceramics, glass and semiconductor materials. Shrinkage and expansion as a result of variations in temperature may cause the cladding to crack or to become detached from the substrate. Besides, undesirable thermal stresses also occur.

A molecularly oriented synthetic resin composition, and a method of manufacturing the composition by curing a liquid crystalline curable synthetic resin composition, are described in U.S. Pat. No. 4,733,941. The oriented synthetic resin composition is provided as a cladding on an optical fiber for telecommunication purposes. The molecules in the synthetic resin composition are oriented in the longitudinal direction of the fiber and subsequently interconnected to form a network by cross-linking. Owing to this, the material has a much larger rigidity in the longitudinal direction than in the radial directions extending perpendicularly thereto. On the other hand, the coefficient of linear thermal expansion in the longitudinal direction is much smaller (at certain temperatures up to a factor of 10 smaller) than in the radial directions.

The difference is provided, for example, by means of a flow of the material, so that small coefficient of expansion is obtained in only one direction. For use of the cladding in many, substantially flat, substrates this does not solve the shrinkage and expansion problems.

OBJECTS AND SUMMARY OF THE INVENTION

One of the objects of the invention is to provide a synthetic resin composition which, when applied as a cladding, exhibits a satisfactory thermal adaptation to the substrate.

A further object of the invention is to provide a synthetic resin composition having particular, temperature-independent optical properties.

Another object of the invention is to provide a synthetic resin composition having a fixed molecular orientation.

Another object of the invention is to provide an effective method of manufacturing such as synthetic resin composition.

According to the invention, it has been found that a molecularly oriented synthetic resin composition as comprising a polymer network having a helicoidal order has coefficients of linear thermal expansion in two mutually perpendicular directions, which below the glass transition temperature, is at least a factor of 3 smaller than in a third direction extending perpendicularly to the first two directions, said synthetic resin composition and above the glass-transition temperature, are even smaller. The coefficient of expansion may even assume negative values in the above-mentioned two mutually perpendicular directions. In this case, thermal shrinkage or expansion is very small over a large temperature range.

When the synthetic resin composition is used in a cladding, according to the invention, the coefficient of linear thermal expansion, below the glass-transition temperature, in two mutually perpendicular directions parallel to the plane of the cladding is at least a factor of 3 smaller than in a third direction extending perpendicularly to the plane of the cladding.

The invention is based on the insight that the coefficient of expansion can be influenced in a number of specific directions by means of a molecular orientation, and that this molecular orientation can be fixed by cross-linking polymer molecules to form a network.

By providing and fixing a helicoidal order, the coefficient of linear expansion is reduced in two directions relative to the non-oriented state. As the volume expansion coefficient of the synthetic resin composition hardly changes by the orientation, the coefficient of expansion in the third direction increases. The latter aspect is less important for use of this composition in a cladding on a substantially flat substrate, and the coefficients of linear expansion in the plane of the layer are better adapted to the substrate.

A method of manufacturing an oriented synthetic resin composition according to the invention comprises curing a liquid-crystalline curable synthetic resin composition which includes a chiral dopant, the molecules of the curable synthetic resin composition being helicoidally ordered, so as to form a polymer network.

In a preferred embodiment of the invention, the curable synthetic resin composition comprises liquid-crystalline monomers or oligomers which are composed of compounds having two or more acrylate-ester groups. If desirable, the curable synthetic resin composition may comprise a mixture of various oligomeric compounds. The synthetic resin composition may further comprise one or more other suitable components such as, for example, catalysts, (light-sensitive) initiators, stabilizers, co-reacting monomers and surface-active compounds. A non-polymerizable liquid-crystalline material, up to a quantity of 50% by weight, may be added to change the optical properties of the material. Instead of acrylate compounds, epoxides, vinyl ethers and thiolene compounds may alternatively and satisfactorily be used as the liquid-crystalline monomer.

In a particular embodiment of the method according to the invention, the helicoidal order is obtained by arranging the synthetic resin composition between two substrates, the surfaces of the substrates contacting the curable synthetic resin composition having the property of aligning the adjacent liquid crystal molecules in a preferred direction obtained for example, by rubbing a polyimide in one direction with a velvet cloth. This causes the molecules of the liquid-crystalline compounds, in particular the mesogenic groups present therein, to orient themselves in the direction of rubbing at the surfaces. By orienting the surfaces so that their rubbing directions are different, the helicoidal order of the molecules may be influenced.

Suitable compounds which can be cured in the oriented state, for example after they have been provided on a rubbed substrate, are described in U.S. Pat. No. 4,758,447 the contents of which are hereby incorporated by reference. A method of manufacturing such compounds is described in European Patent Application 1-0 261 712 corresponding to U.S. Pat. No. 4,892,392 the contents of which are hereby incorporated by reference.

As a rapid curing of the synthetic resin composition is desirable, the curing process is initiated, preferably, by means of actinic radiation. Actinic radiation is to be understood to mean herein radiation using light, in particular UV light, X-rays, gamma rays or radiation using high-energy particles such as electrons or ions.

BRIEF DESCRIPTION OF THE DRAWING

The invention will be explained in greater detail by means of an exemplary embodiment and with reference to the accompanying drawing, in which.

EXEMPLARY EMBODIMENT

Figure 1:
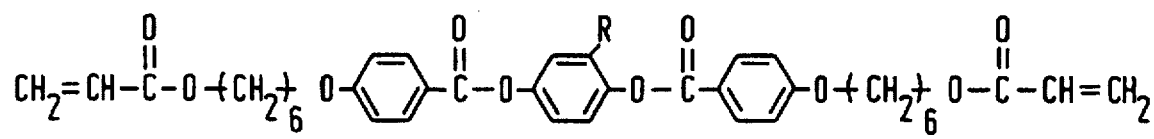
FIG. 1 shows the structural formula of liquid-crystalline compounds having two acrylate-ester groups, which are suitable for use in the invention.

A starting mixture for a curable synthetic resin composition is manufactured from 80 parts by weight of a first diacrylate compound A, having the structure shown in FIG. 1, where R is a methyl group, 20 parts by weight of a second diacrylate compound B, also having the structure shown in FIG. 1, where R is a hydrogen atom, and 1 part by weight of a light-sensitive initiator, in the present example 2,2-dimethoxy-2-phenyl-acetophenone, commercially available from Ciba-Geigy under the trade name Irgacure($^R$) 651. A method of manufacturing said diacrylate compounds is described in European Patent Application 1-0 261 712. The starting mixture additionally comprises 100 ppm of a stabilizer, for example hydroquinone monomethyl ether.

The starting mixture which comprises 80 parts by weight of A and 20 parts by weight of B is a eutectic composition having a melting point of 80° C. Above this temperature there exists a nematic phase which changes into an isotropic phase at a temperature of 121° C. The mixture is used between these two temperatures, both the viscosity and the molecular order being highest at the lowest temperatures.

Figure 2:
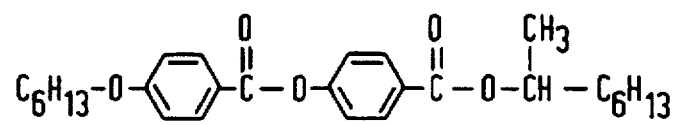
FIG. 2 shows the structural formula of a suitable chiral dopant.

According to this example, different quantities of a chiral dopant are added to the starting mixture, for example left-handed 4-(4-hexyloxy-benzoyloxy)-benzoic acid-2-octyl-ester, having the structure shown in FIG. 2, which is commercially available from Merck under number S811.

The chiral dopant itself does not have to exhibit liquid-crystalline properties and may be a co-polymerizing monomer as well as a non-polymerizable compound. To obtain a twisted nematic order in the polymer, it is sufficient for the compound to be chiral, for example through the fact that the compound contains an asymmetrical carbon atom. The chiral dopant may be right-handed as well as left-handed.

A layer of the material obtained in this manner has a nematic order, with a helical structure, also termed cholesteric order. The natural pitch of the mixture depends on the quantity of chiral dopant added and is approximately 28 μm at 0.5 mol. % and approximately 2.5 μm at 6 mol. %. The natural pitch depends to a small extent on the temperature and when 6.67 mol. % of the chiral dopant is used, the natural pitch is 2.17 μm at 80° C., 2.31 μm at 100° C. and 2.35 μm at 113° C. the transition to the isotropic phase depends on the quantity of dopant and at this quantity takes place at a temperature of 114° C.

According to this example, the curable synthetic resin composition is cured by at 100° C. photopolymerization through exposure to ultraviolet light for 3 minutes from a short-arc mercury lamp having a radiation intensity on the surface to be cured of 2 to 5 mW/cm$^2$. The orientation is fixed in the curing process, the overall rotation angle of the layer thereafter remaining constant. The rotation angle is a measure of the number of revolutions in the molecular spiral in the cholesteric nematic phase. For this reason, the variation in pitch during curing depends only on the change in layer thickness caused by polymerization shrinkage.

The rotation angle of the polymer film thus obtained exhibits no temperature dependence in the temperature range from room temperature to 250° C., demonstrating the complete resistance to molecular re-orientation as a result of the network of polymer molecules formed by crosslinking. As the monomers contain two acrylate-ester groups per molecule, cross-linking is so strong that substantially no movement is possible in the rigid parts of the liquid-crystalline molecules.

Figure 3:
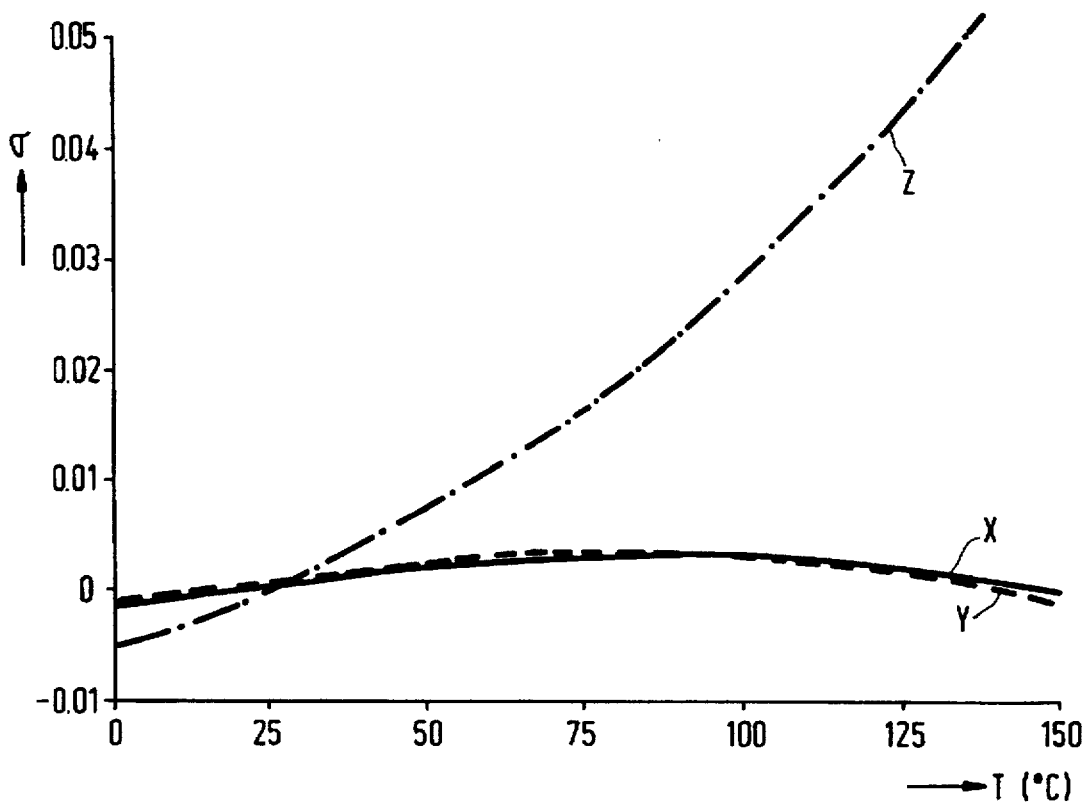
FIG. 3 shows the thermal expansion of an oriented material according to the invention.

FIG. 3 shows σ in three mutually perpendicular directions as a function of the temperature T of a polymer film of the invention. σ is the relative change in length with respect to a reference length at 25° C. The direction of thickness of the polymer film is z, the directions x and y extend in the plane of the polymer film. In the z-direction the coefficient of thermal expansion σ/T below the glass-transition temperature (approximately 90° C.) is approximately 2 to $4\times10^{-4}$/° C. Above said temperature the coefficient of thermal expansion increases to approximately $7\times10^{-4}$/° C. In the x- and y-directions the coefficient of thermal expansion below the glass-transition temperature is less than $5\times10^{-5}$/° C. At the glass-transition temperature the coefficient of expansion decreases and even becomes negative above said temperature. As a result, there are hardly any changes in length in the x- and y-directions in the temperature range from 25° to 140° C. The shrinkage occurring when the temperature increases to above the glass-transition temperature is reversible.

Figure 4:
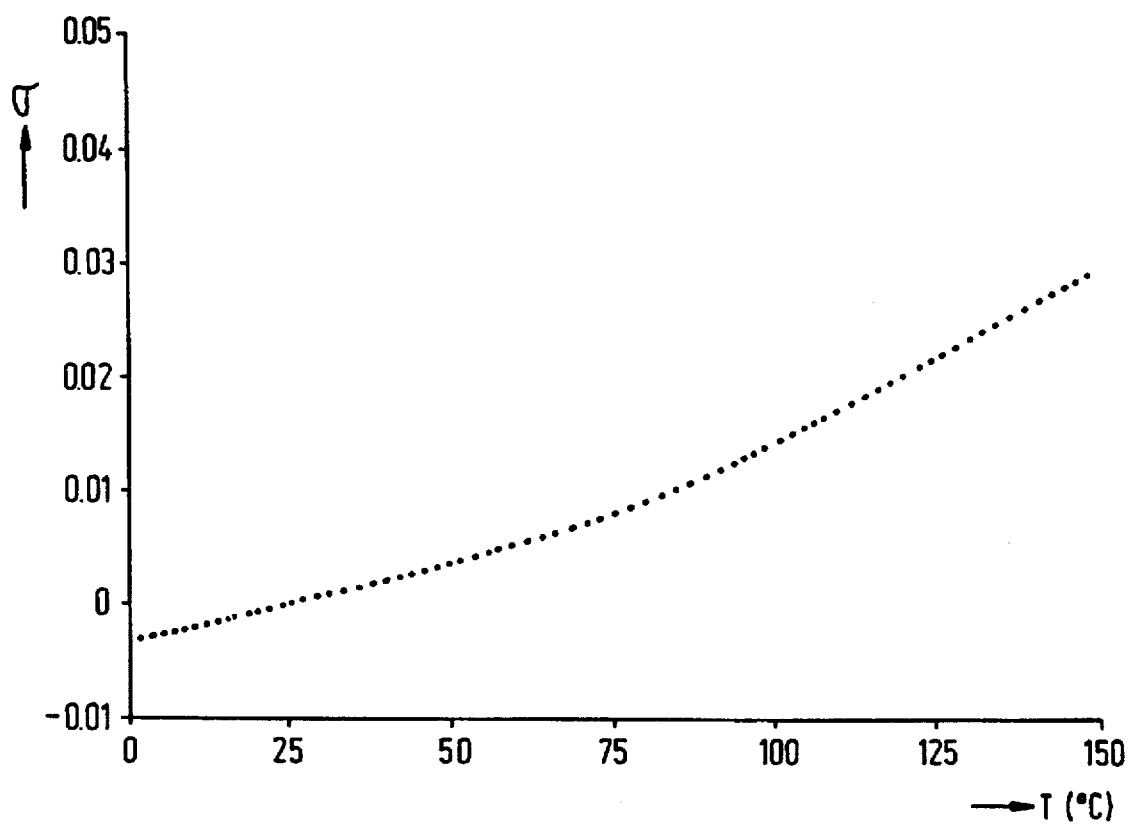
FIG. 4 shows, for comparison, the thermal expansion of an isotropic material according to the prior art.

For comparison, FIG. 4 shows the relative change in length σ with temperature T of an isotropic material which has the same composition as to the material according to the invention. The coefficient of expansion σ/T is the same in all directions. The coefficient of expansion is approximately $10^{-4}$/° C. at a temperature below the glass-transition temperature, while above the glass-transition temperature it increases to approximately $4\times10^{-4}$/° C.

By virtue of the above-described expansion properties, the material according to the invention is very suitable for use as a cladding material, for example, on semiconductor devices and other materials having a coefficient of expansion which is smaller than that of most synthetic resins. An advantage for optical use of the polymer film obtained is the relatively small temperature dependence of the rotation angle in comparison with, for example, linear cholesteric polymers having chiral groups in side chains.

Within certain limits, the pitch can be influenced by curing the synthetic resin composition between two substrates. Preferably, flat substrates of polyimide or glass having a cladding of polyimide are used. The polyimide surface is rubbed uniaxially, for example, using a velvet cloth. The pitch depends on the distance between the two substrates, for example, 6 µm, and the angle between the two rubbed directions of the polyimide surfaces. The number of revolutions of the molecular spiral adjusts itself such that the pitch obtained does not differ too much from the natural pitch.

A particular optical device is obtained by manufacturing a layer having a rotation angle across the entire layer thickness of exactly 90°. In such a device the plane of polarization of transmitted light is rotated through 90° when the condition is met that $d\Delta n/\lambda$ is larger than 0.87, where d is the layer thickness, $\Delta n$ is the birefringence and $\lambda$ is the predominant or average wavelength of the transmitted light.

It is also possible to obtain a wavelength filter by manufacturing a layer whose pitch is equal to the wavelength of the light to be filtered. Such light is reflected at the layer, whereas light having other wavelengths is transmitted.

We claim:

1. A cladding of a molecularly oriented resin composition on a substrate, said substrate having a coefficient of linear thermal expansion of an order of magnitude smaller than that of synthetic resin claddings which are formed of polymer networks which do not have helicoidal orders, characterized in that said molecularly oriented synthetic resin composition comprises a cross-linked liquid crystalline polymer network and a chiral compound in an amount sufficient such that said polymer network has a helicoidal order of a pitch such that the coefficient of linear expansion of said cladding in two mutually perpendicular directions parallel to the plane of said cladding, at a temperature below that of the glass transition temperature, is at least a factor of 3 smaller than in a third direction extending perpendicularly to the plane of said cladding.

2. The cladding of claim 1 characterized in that the cross-linked polymer network comprises polymerized cross-linked liquid crystalline monomers or oligomers having at least two acrylate ester groups.

3. The cladding of claim 1 wherein the substrate is a metal, a ceramic, a glass or a semiconductor material.

* * * * *